United States Patent [19]

Giberson

[11] Patent Number: 5,438,755
[45] Date of Patent: Aug. 8, 1995

[54] METHOD OF MAKING A MONOLITHIC SHROUDED IMPELLER

[76] Inventor: Melbourne F. Giberson, 5 Spring Mill La., Haverford, Pa. 19041

[21] Appl. No.: 153,646

[22] Filed: Nov. 17, 1993

[51] Int. Cl.⁶ .............................................. B23P 15/00
[52] U.S. Cl. ........................................ 29/889; 29/558; 409/80
[58] Field of Search .............. 29/889, 557, 558, 23.51, 29/56.5, 33 C, 564; 409/80

[56] References Cited

U.S. PATENT DOCUMENTS

| | | | |
|---|---|---|---|
| 1,919,970 | 7/1933 | Woods | 29/889 |
| 2,480,807 | 8/1949 | De Vlieg et al. | 409/119 |
| 2,585,920 | 2/1952 | De Vlieg et al. | 409/66 |
| 2,909,966 | 10/1959 | Bareus | 409/119 |
| 4,578,006 | 3/1986 | Gray | 409/348 |
| 5,106,012 | 4/1992 | Hyzak et al. | 29/889 |
| 5,113,583 | 5/1992 | Jenkel et al. | 29/889 |
| 5,131,142 | 7/1992 | Brasz | 29/889 |

Primary Examiner—Irene Cuda
Attorney, Agent, or Firm—Polster, Lieder, Woodruff & Lucchesi

[57] ABSTRACT

A high strength, monolithic shrouded impeller is made from a single blank by a method that includes the following four steps: Turning and boring a rough forging to an impeller profile; Using a three-dimensional CNC milling machine with end mills, removing as much material as possible from what are to be passageways in the impeller, defining leading and trailing edge zones of vanes defining the passageways, by removing material in direct line of sight from the outside diameter or from the eye of the impeller or both; Forming a hole through a central zone of what will be each impeller passageway, and removing the remainder of the material to define the passageways by three dimensional planning controlled by the CNC machine using a non-rotating tool.

7 Claims, 2 Drawing Sheets

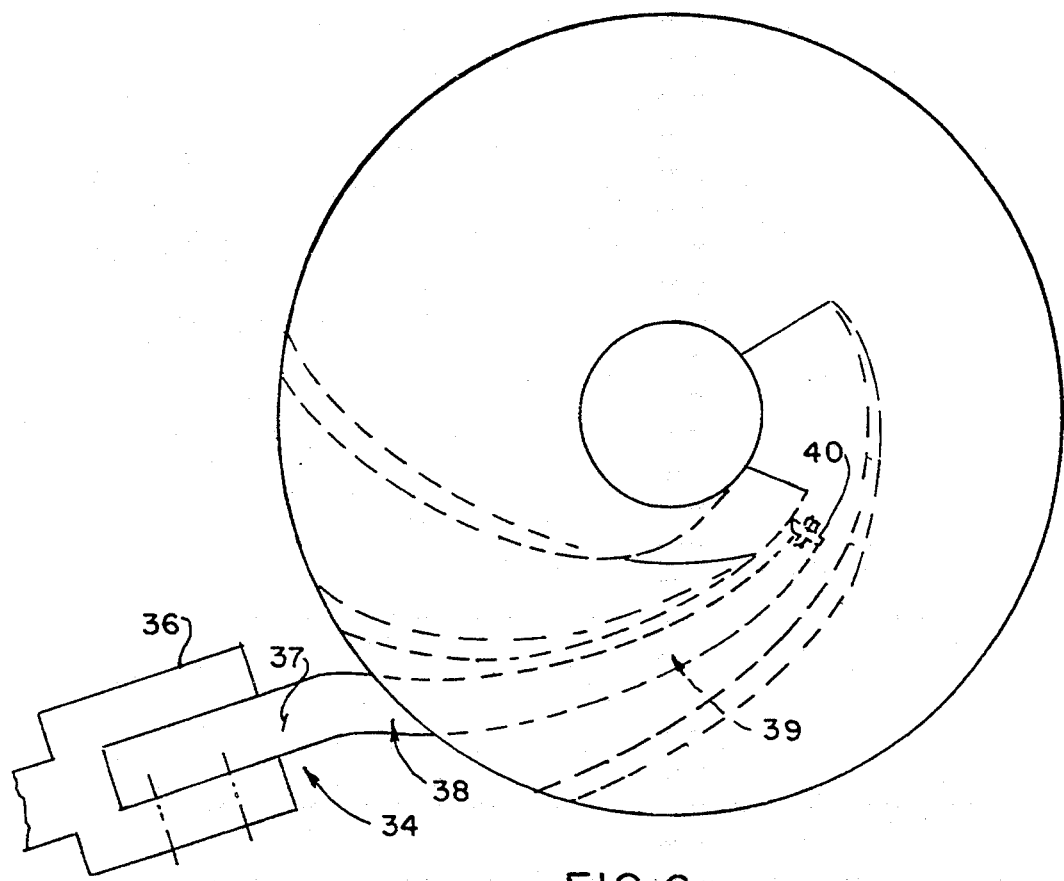
FIG. 6.
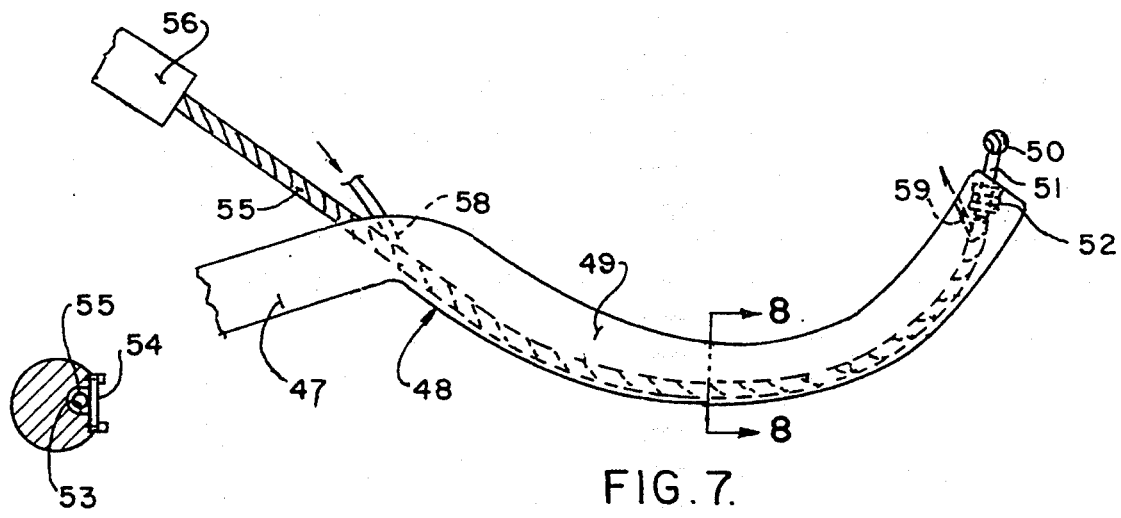
FIG. 7.
FIG. 8.

METHOD OF MAKING A MONOLITHIC SHROUDED IMPELLER

BACKGROUND OF THE INVENTION

Shrouded impellers are used in place of open impellers in a number of applications, including high blade loading conditions, in those situations in which there are requirements for reduced seal flow losses, requirements for high natural frequencies of the blades and certain high speed conditions where an attached shroud can reduce centrifugal stresses. A typical application for a shrouded impeller is in boiler feed water pumps.

Typical conventional methods of construction of shrouded impellers are (1) as a one-piece casting, with finish machining of the bore outside diameters and faces, and hand polishing of the inside of passageways; (2) casting or forging separately a hub and shroud, then machining them to shape, machining or forging vanes, welding the hub and shroud to the vanes, stress relieving the welded assembly, finish machining the bore and outside surfaces, and hand polishing the passageways, or, (3) for the greatest strength in conventional impellers, forging an oversize hub including vane profiles and forging a shroud, CNC or profiling machining passageways between vanes so that the vanes and hub are integral, CNC or profile machining a shroud, welding the shroud and vanes and hub together at the intersection of the vanes and the shroud, stress relieving the welded assembly, finish machining the bore and outside surfaces, and hand polishing the welded portion of the passageways.

In the cast impeller, the surfaces defining the passageways are likely to be pitted and rough in parts, simply by the nature of the casting process. Furthermore, the cast impeller is not as strong as a forged impeller. In both the second and third methods, the welds pose problems both in polishing and strength.

One of the objects of this invention is to provide a monolithic shrouded impeller of superior strength and efficiency as compared with shrouded impellers used heretofore.

Another object is to provide a method of making such an impeller.

Other objects will become apparent to those skilled in the art in the light of the following description and accompanying drawing.

SUMMARY OF THE INVENTION

In accordance with this invention, generally stated, a monolithic shrouded impeller, described in the preferred embodiment as a one-piece forged alloy steel shrouded impeller, is provided, free of welds and pits. The impeller is produced in four to six steps. First, a rough, solid one-piece blank is turned and bored to an impeller profile that is somewhat oversize with respect to the finished impeller. Next, using a three dimensional CNC milling machine with end mills, as much material as possible is removed from what are to be the ends of passageways in the impeller, to define leading and trailing edge zones of the impeller passageways. The material in those passageways is, in this step, removed in direct line of sight from the outside diameter and from an eye of the impeller blank. Next, a hole is formed through a central zone of each impeller passageway area, roughly to define the passageway. Then, the remainder of the material in the passageways is removed by three dimensional planing controlled by the CNC machine, preferably leaving a few thousandths of excess material for a finishing step.

The impeller can be stress relieved at this stage if it seems desirable to do so. The impeller then is finish machined, typically by boring the inside diameter of the hub and turning other surfaces for reference surfaces; using rotating tools, finish machining the leading and trailing edges to the degree that is possible and efficient to do in direct line of sight from the outside diameter or from the eye of the impeller by means of the CNC machine, and last, in the planing mode, finish machining the passageway using either non-rotating scraping tooling of the sort described hereinafter, or as an alternative method of opening the hole and finishing the passageway, using a small remotely driven rotating bit held in a curved tool-holder, also described hereinafter.

The shrouded impeller that results has passageways that are all the same, with no welds to polish, and the uniformity of passageway geometry and the smoothness of the surface finish provide a substantial improvement in the efficiency of the pump in which it is installed, as well as increased strength over the impellers known heretofore.

IN THE DRAWINGS

In the drawing, FIG. 1 is a view in perspective of an eye side of a shrouded impeller of this invention;

FIG. 6 is a somewhat schematic view of the tool of FIG. 5 in the process of being used;

FIG. 7 is a somewhat schematic view of a remotely driven tool bit in a non-rotating curved tool-holder; and FIG. 8 is a sectional view taken along the line 8—8 of FIG. 7.

DESCRIPTION OF THE PREFERRED EMBODIMENTS

Figure 1:
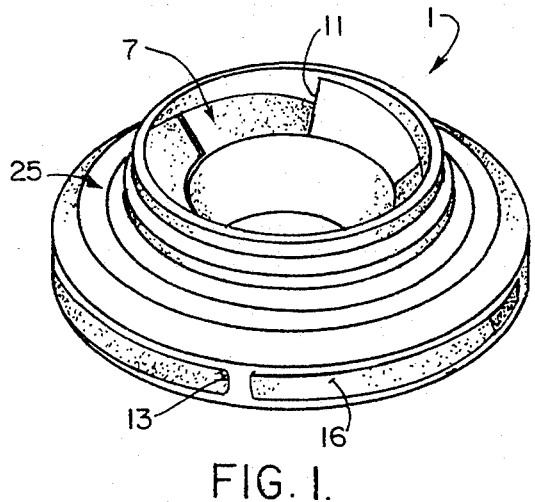
Figure 2:
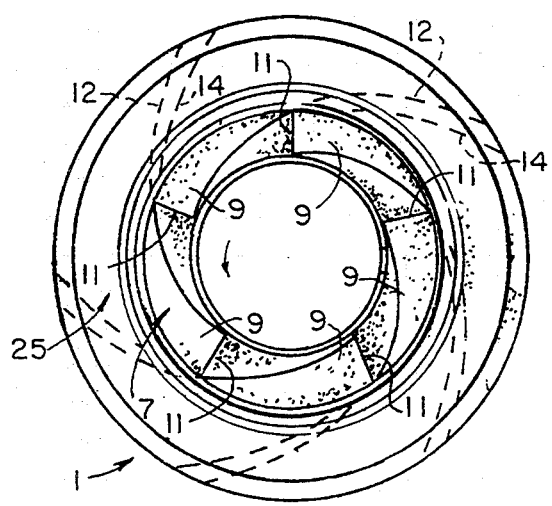
FIG. 2 is a view in front elevation of the impeller shown in FIG. 1.
Figure 4:
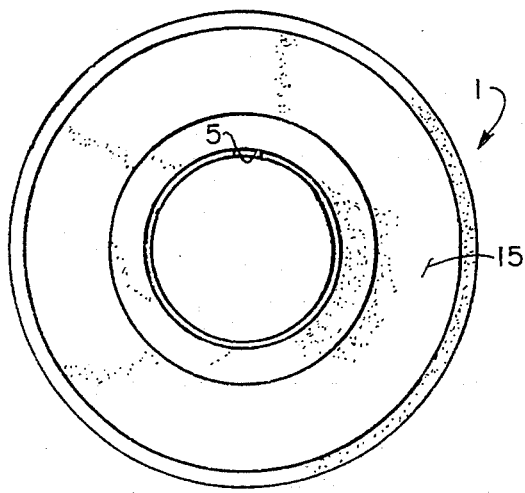
FIG. 4 is a view in rear elevation.

Referring now to the drawings for one illustrative embodiment of shrouded impeller of this invention and the method of its manufacture, reference numeral 1 indicates a completed shrouded impeller. The impeller 1 has the usual hub 3 with a keyway 5 for mounting to the shaft of a machine by which the impeller is driven. An impeller of this invention finds particular utility in boiler feed water pumps which, as described more fully in my co-pending application Ser. No. 08/016,784, are driven by the output shaft of the fluid drive. Such a pump is designed to absorb between 200 and 30,000 horse power in units in present use, the impeller rotating at speeds of 800 to 7,000 rpm, speed increasing gears being used when required.

The impeller has the usual eye 7, an annular inlet area at which leading edges 11 of vanes 9 end. The vanes 9 have trailing edges 13 that end at the periphery of a back plate 15, part of the hub 3. The vanes 9 are, in this embodiment, integral with the plate 15 and with a shroud 25. Pressure surfaces 12 and suction surfaces 14 of the vanes 9 define, with inside surfaces 16 of the plate 15, and inside surfaces 26 of the shroud 25, passageways 17, opening into the eye 7 and through the outer periphery of the impeller.

Figure 5:
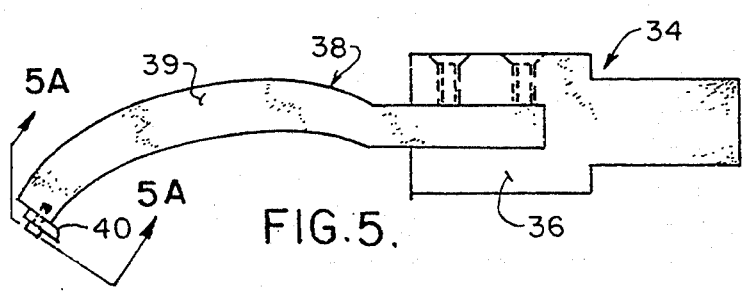
FIG. 5 is a view in side elevation of tooling for a non-rotating planing or scraping step of the method of this invention.
Figure 5A:
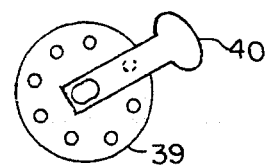
FIG. 5A is a view of the end of the scraper tool/planing tool showing how the tool tip can be located at several angles to facilitate material removal all around the passageway.

Tools used at one or two stages in the formation of the impeller are illustrated in FIGS. 5–8. A reciprocating, non-rotating tool assembly 34 is illustrated in FIGS. 5 and 6. A conventional CNC machine tool holder 36 receives a straight portion 37 of a tool shank 38. The tool shank 38 has a contoured, curved portion 39, on an outer end of which a scraping tool bit 40 is mounted. In FIGS. 7 and 8, a rotating bit 50, with a shaft 51, is mounted in journal and thrust bearings 52 carried by an outer end part of a curved portion 49 of a tool shank 48. The tool shank 48 has a straight portion 47, which is mounted in a tool holder like the holder 36. The tool shank 48 has a channel 53 in it, covered by a cover plate 54. The shaft 51 is connected to be driven by a flexible cable 55 the other end of which is connected to be driven by an auxiliary driving motor 56. The motor 56 can, for example, be a one-half horsepower, variable speed motor. A coolant passage 58 communicates at one end with the channel 53, and at it other, with a coolant supply line, through which coolant and lubricant is forced. The coolant-lubricant mixture leaves the channel at the bearing end of the shank through an exit passage 59, close enough to the bearings 52 to ensure their being lubricated.

In any case, the contoured part of the shank is shaped both as to length and circumference, and dimensioned so as to reach beyond the line of sight from either the outside diameter of the impeller (blank) or the eye of the impeller and to fit within a passage to be enlarged or finished, as described hereinafter.

In making the shrouded impeller 1, in this illustrative embodiment, a rough forged alloy steel blank is first turned and bored to the external profile of the impeller, approximately three percent (3%) oversize with respect to the finished impeller. Next, using a three dimensional CNC milling machine with conventional end mills, with ball end mills where appropriate, as much material as possible is removed from the passageways. The leading edge and trailing edge zones can usually be completed with this step, i.e., all material in the passageway in a direct line of sight from the outside diameter and from the eye is removed. A limitation to the depth of penetration in this step is the length to diameter dimension of the tools. Some material may be in the direct line of sight, but too deep to be efficiently removed in this step.

Figure 3:
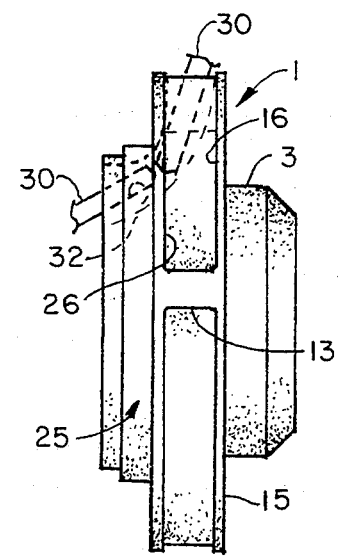
FIG. 3 is view in edge elevation of an impeller in the process of being made in accordance with this invention.

A hole is then made through the central section which is to be the passageway, either by drilling, as indicated in FIG. 3, or by milling or electro-discharge machining, or use of a small remotely driven rotating tool held in a curved tool holder as illustrated in FIG. 7, or some combination of those methods. In the preferred embodiment shown, it is made by drilling. After the hole has been made completely through from the perimeter to the eye, the remainder of the material in the passageway is removed by a three dimensional planing effect either using one or more reciprocating tools shaped generally as shown in FIGS. 5 and 6, or by the remotely driven rotary tool of FIG. 7. Different such tools, differently shaped and with longer or shorter shanks will be used in the course of the operation, as the length and contour of the vanes requires. The tools of FIG. 5 and 6 do not rotate but scrape away material as the tool bit tip follows a prescribed path controlled by a CNC machine under three dimensional computer control. Successive tools of increasing blade size and of different shapes and radii are used to produce the desired contour of the passageways. The material can be removed in sections, or in long continuous strokes, but in any event, at this stage it is desirable to leave on the order of 0.005" to 0.020" material in place over the final dimensions. An alternate to the non-rotating tool bit is the rotating tool bit of FIG. 7. Similarly, a variety of curved tool holders and angles of the rotating tool bit, and shapes and sizes of bits, may be used to remove material to the same depth as the scraping tools.

The impeller can be stress relieved at this stage, if desired.

Finally, the impeller is finish machined, typically as follows: the hub I.D. is bored to the exact size, and the outer surfaces of the impeller are turned to their final dimensions. Using rotating tools, the leading and trailing edges of the vanes are finish machined to the degree that it is possible and efficient to do so with the CNC machine. Finally, in the planing mode, the passageways are finish machined, using either the non-rotating tooling, which is changed from one tool to the next as different portions of the passageway surfaces are finished, or the rotating tools, which also may be varied as to size, shape, and composition.

The passageways in the shrouded impeller made in accordance with the methods described, are substantially identical. There are no welds to polish deep inside the passageway. The uniformity of passageway geometry and the smoothness of the surface finish produce a substantial improvement in the efficiency of the pump over pumps made by conventional methods, and the one-piece (monolithic) construction makes for improved strength.

Numerous variations in the method within the scope of the appended claim, will occur to those skilled in the art in the light of the foregoing disclosure. The impeller shown and described can be one of several in a multi-stage pump. Any number of vanes can be formed; generally the number of vanes is between 5 and 21. In the embodiment shown, the shroud is shown as stepped on its outside surface to provide seal areas concentric with the bore of the hub, as shown particularly in FIGS. 1 and 3. However, particularly the annular area contiguous the impeller can be shaped complimentarily to the passageways, if desired. The impeller blank has been described as a forged alloy steel blank. The method is equally applicable to stainless steel, carbon steel, brass, bronze or even plastic. These variations are merely illustrative.

I claim:

1. A method of producing a high strength shrouded impeller from a rough monolithic blank comprising the following steps:

(1) turning and boring the rough blank to an impeller profile circular in elevation, with an annular outer surface and a central eye, between which passageways are to extend;

(2) using a three dimensional CNC milling machine with end mills, removing as much material as possible from what will be passageways in the impeller, and defining leading and trailing edge zones of vanes, by removing material in direct line of sight from the annular outer surface in a direction toward the eye and from the eye toward the annular outer surface of the impeller;

(3) roughly defining passageways and vanes by forming a hole through a central zone of each said passageway; and (4) removing any unwanted remaining material in the passageways by three dimensional planing controlled by said CNC machine.

2. The method of claim 1 wherein the three dimensional planing is performed with a reciprocating, non-rotating scraping tool.

3. The method of claim 1 wherein the three dimensional planing is performed with a remotely driven rotating tool bit on the end of a contoured tool shank.

4. The method of claim 1 including the additional steps of finish machining the impeller by boring to size a central axial bore and turning radially outer surfaces for reference surfaces; using rotating tools, finish machining the leading and trailing edges of the vanes, to the degree it is possible and efficient to do so with a CNC machine, and finish machining the passageways using CNC controlled tooling.

5. The method of claim 4 wherein the finish machining of the passageways is performed with a reciprocating, non-rotating scraping tool.

6. The method of claim 4 wherein the finish machining of the passageways is performed with a remotely driven rotating tool bit on the end of a contoured tool shank.

7. The method of claim 4 including a step of stress relieving the impeller before performing the finish machining.

* * * * *